(12) United States Patent
Wan et al.

(10) Patent No.: US 6,772,102 B1
(45) Date of Patent: Aug. 3, 2004

(54) OPTIMAL PLACEMENT OF WAVELENGTH CONVERTERS IN TREES AND TREES OF RINGS

(75) Inventors: Peng-Jun Wan, Chicago, IL (US); Ophir Frieder, Chicago, IL (US); Liwu Liu, Chicago, IL (US)

(73) Assignee: Illinois Institute of Technology, Chicago, IL (US)

( * ) Notice: Subject to any disclaimer, the term of this patent is extended or adjusted under 35 U.S.C. 154(b) by 562 days.

(21) Appl. No.: 09/660,669

(22) Filed: Sep. 13, 2000

(51) Int. Cl.[7] ......................... G06F 17/10; G06F 17/50
(52) U.S. Cl. ................... 703/2; 398/50; 398/68
(58) Field of Search ................ 703/2; 359/128, 359/123, 332, 326; 716/2; 398/50, 45, 95, 7, 68, 83; 370/342, 329

(56) References Cited

U.S. PATENT DOCUMENTS

| | | | |
|---|---|---|---|
| 5,194,977 A | 3/1993 | Nishio | 359/128 |
| 5,303,077 A | 4/1994 | Bottle et al. | 359/123 |
| 5,434,700 A | 7/1995 | Yoo | 359/332 |
| 5,587,919 A | 12/1996 | Cheng et al. | 716/2 |
| 5,619,368 A | 4/1997 | Swanson | 359/326 |
| 5,724,167 A | 3/1998 | Sabella | 398/50 |
| 5,757,527 A | 5/1998 | Mock | 398/45 |
| 5,825,517 A * | 10/1998 | Antoniades et al. | 359/117 |
| 5,894,362 A | 4/1999 | Onaka et al. | 398/95 |
| 5,914,798 A | 6/1999 | Liu | 398/7 |
| 5,923,651 A | 7/1999 | Struhsaker | 370/342 |
| 5,959,749 A | 9/1999 | Danagher et al. | 398/83 |
| 6,005,698 A | 12/1999 | Huber et al. | 398/50 |
| 6,005,851 A | 12/1999 | Craddock et al. | 370/329 |
| 6,067,259 A * | 5/2000 | Handa et al. | 365/200 |

OTHER PUBLICATIONS

Wan et al., P. Optimal Placement of Wavelength Converters in Trees and Trees of Rings, Eight International Conference on Computer Coomunications and Networks, IEEE, Oct. 1999, pp. 392–397.*

Venugopal et al., K.R. A Heuristic for Placement of Limited Range Wavelength Converters in All–Opitcal Networks, Eighteenth Annual Joint Conference of the IEEE Computer and Communications Societies, IEEE, vol. 2, Mar. 1999, pp. 908–915.*

Watanabe et al., T. Vertex Covers and Connected Vertex Covers in 3–Connected Graphs, IEEE International Symposium on Circuits and Systems 1991, Jun. 1991, pp. 1017–1020.*

Yuan et al., S. A New Technique for Optimization Problems in Graph Theory, IEEE Transactions on Computers, vol. 47, Issue 2, Feb. 1998, pp. 190–196.*

Jon Kleinberg and Amit Kumar: *Wavelength Conversion in Optical Networks*, Proceedings of the 10th ACM–SIAM Symposium On Discrete Algorithms, 566–575, 1999.

Ralph Ballart and Yau–Chau Ching: *SONET: Now Its the Standard Optical Network*, IEEE Communications Magazine, Mar. 8–15, 1989.

Gordon Wilfong and Peter Winkler: *Ring Routing and Wavelength Translation*, Proceedings of the 9th ACM–SIAM Symposium On Discrete Algorithms, 333–341, 1998.

* cited by examiner

*Primary Examiner*—Russell Frejd
(74) *Attorney, Agent, or Firm*—Pauley Petersen & Erickson

(57) ABSTRACT

A method for determining an optimal placement of wavelength converters in an optical network while optimizing bandwidth use in which a skeleton undirected graph of a WDM network is generated, a contraction graph is constructed from the skeleton undirected graph, and a minimum vertex cover of the contraction graph is determined.

13 Claims, 7 Drawing Sheets

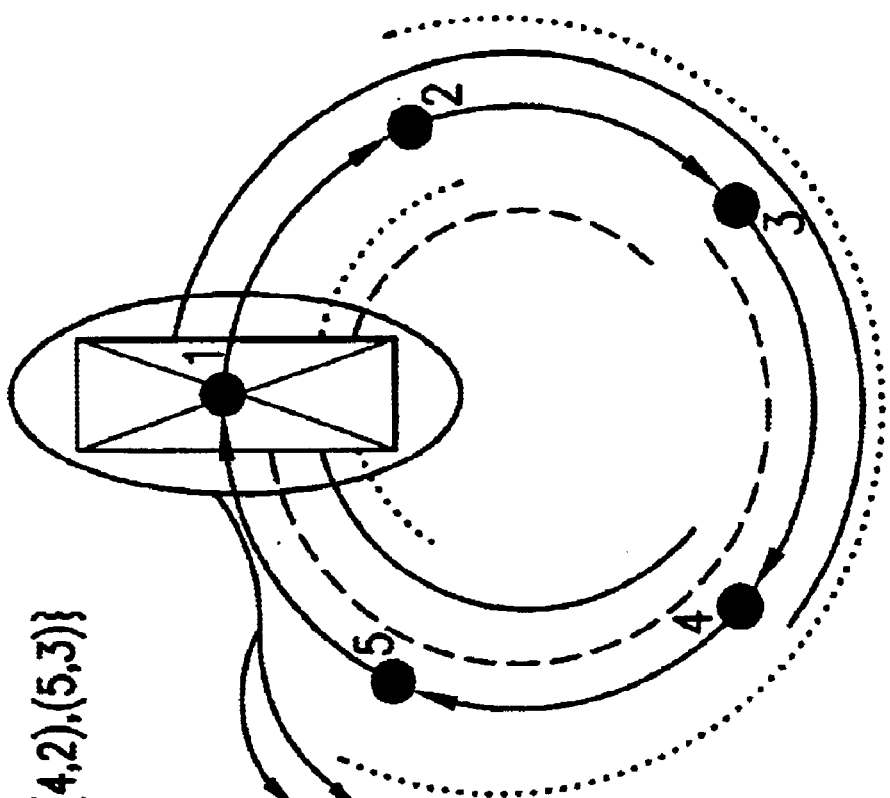

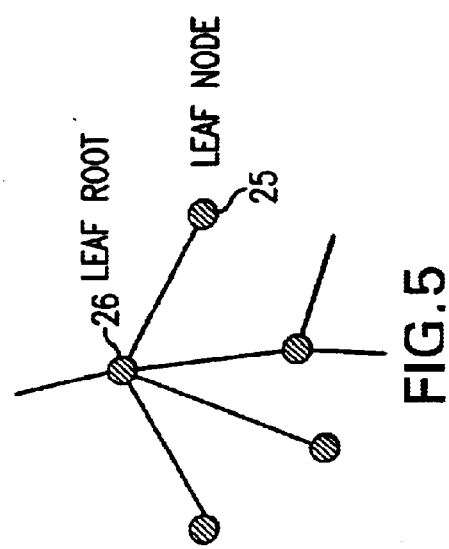
FIG.5
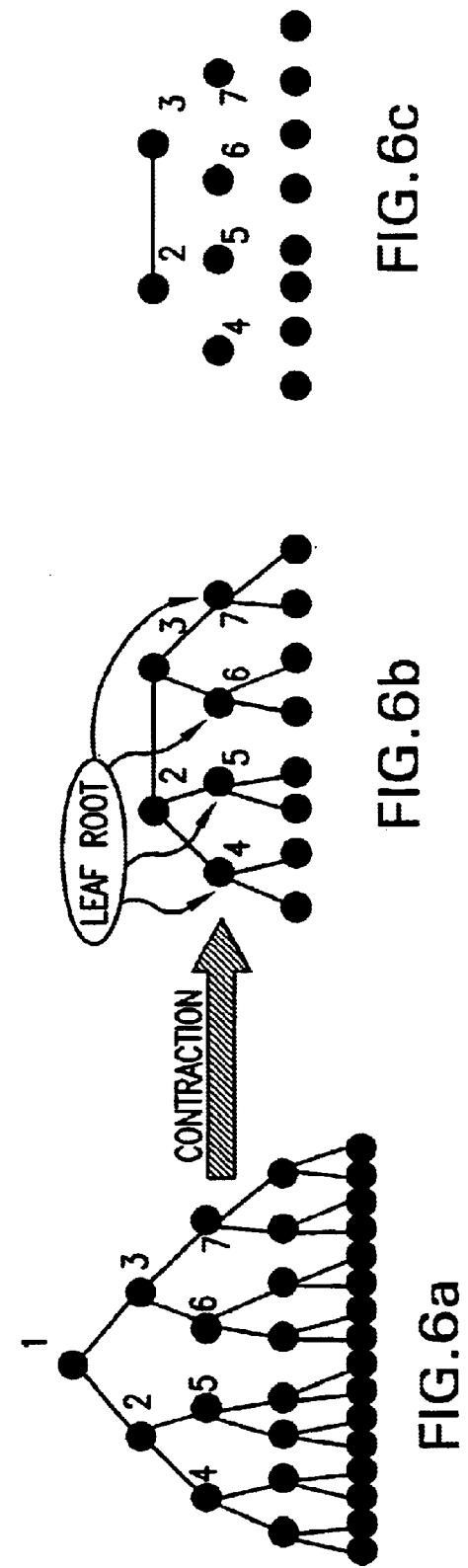
FIG.6a
FIG.6b
FIG.6c

OPTIMAL PLACEMENT OF WAVELENGTH CONVERTERS IN TREES AND TREES OF RINGS

BACKGROUND OF THE INVENTION

1. Field of the Invention

This invention relates to a method for determining the optimal placement of wavelength converters in optical networks and, more particularly, to a method for placing the minimum number of wavelength converters in a fiber optic network, all the while optimizing the bandwidth use. The invention maps minimal converters to support optimal bandwidth utilization in hierarchically structured fiber optic networks, including trees, trees of rings, forests, and any combination thereof connected networks.

2. Description of Prior Art

In wavelength-routed WDM (wavelengths-division multiplex) optical networks without any wavelength conversion, the wavelength assignment must meet the wavelength continuity constraint; that is, the same wavelength is allocated on all the links in the path established for a connection. However, this constraint can be relaxed when wavelength converters are placed at certain nodes. If a node of the network contains a wavelength converter, any path that passes through this node may change its wavelength. In a network with wavelength converters, the wavelengths are assigned to individual links of all paths, with the restriction that the same wavelength be allocated on all of the links in any subpath that does not pass through a wavelength converter. It is apparent that wavelength assignments in networks with wavelength converters can sometimes be more efficient, that is use fewer wavelengths, than optimal wavelength assignments for the same set of paths when no wavelength converters are available. One extreme example is that if each node contains a wavelength converter, the number of wavelengths required for any routing is reduced down to the natural congestion or load bound, defined to be the maximum number of paths passing through any one link in the network. Another extreme example is placement of a converter at a single arbitrary node in a WDM ring, which ensures that the number of wavelengths required for any routing is equal to its load.

This, in turn, raises the question as to the placement of wavelength converters in a WDM network so that any routing can be satisfied using no more wavelengths than if there were wavelength converters at every node. A set S of nodes in a network is defined to be sufficient if, placing converters at the nodes in S, every set of paths can be routed with a number of wavelengths equal to its congestion bound. The minimum sufficient set problem (MSSP) was shown to be NP-complete in general WDM networks. In Kleinberg, J. et al., "Wavelength Conversion in Optical Networks", *Proceedings 10th ACM-SIAM Symposium On Discrete Algorithms*, 1999, a tight connection between the minimum sufficient set problem in bi-directed graphs and the minimum vertex cover problem in undirected graphs was established. As a consequence of this connection, a simple two-approximation algorithm for a minimum sufficient set problem in bi-directed graphs was obtained. In addition, it is relatively easy to give an approximation-preserving reduction from the minimum vertex cover problem to the minimum sufficient set problem in bi-directed graphs.

While the teachings of Kleinberg, J. et al. set forth approximation solutions for general WDM networks, the topologies of most practical WDM networks are not general. In particular, trees and trees of rings are of more practical concrete relevance to the telecommunications industry. For practical reasons, backbone telecommunication networks need to reflect irregularity of geography, non-uniform clustering of users and traffic, hierarchy of services, dynamic growth, etc. In addition, wide-area multiwavelength technology is evolving around current signal wavelength networking architectures and existing fiber networks. These are mainly SONET rings and tree-like interconnection of such rings. (See, for example, Ballart, R. et al., "SONET: Now its the standard optical network", *IEEE Communications Magazine*, Pages 8–15, March 1989.)

We have found that the minimum sufficient set problem in these special topologies can be solved in polynomial time and, therefore, is not NP-complete. Our algorithms to find the minimum sufficient sets in these topologies are based on the reduction of the minimum sufficient set problem to the minimum vertex cover problem. These algorithms are very efficient and easy to implement.

SUMMARY OF THE INVENTION

It is one object of this invention to provide a method for determining the optimal placement of wavelength converters in a fiber optic network so as to utilize the minimum number of wavelength converters while optimizing the bandwidth use.

This and other objects of this invention are addressed by a method for determining an optimal placement of wavelength converters in an optical network while optimizing bandwidth use comprising the steps of generating a skeleton undirected graph of a WDM network, constructing a contraction graph from the skeleton undirected graph, and determining a minimum vertex cover of the contraction graph. This method is applicable to WDM networks comprising any of a number of underlining topologies including, but not limited to, trees, rings, trees of rings, forests and any combinations thereof.

BRIEF DESCRIPTION OF THE DRAWINGS

These and other objects and features of this invention will be better understood from the following detailed description taken in conjunction with the drawings wherein:

FIG. 2c is a diagram of the network of FIG. 2b, which shows the manner in which the number of wavelengths required is reduced by the wavelength converter from five to three;

FIG. 5 is a diagram showing a leaf root and leaf node arrangement;

FIGS. 6a, 6b and 6c are diagrams showing application of the algorithm utilized in the method of this invention to a binary tree.

DESCRIPTION OF PREFERRED EMBODIMENTS

Definitions

Figure 1A:
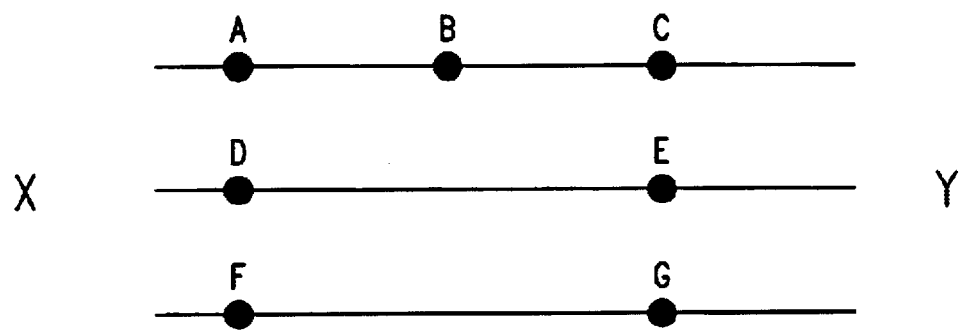
FIG. 1a is a diagram showing possible paths which can be taken in a network to get from point X to point Y.

As used herein, the term "graph" refers to a set of vertices or nodes connected by edges or lines. Graphs are usually represented by G=(V, E), where V is the set of vertices and E is the set of edges.

As used herein, the term "undirected graph" refers to a graph whose edges are unordered pairs of vertices. That is, each edge connects two vertices.

As used herein, the term "directed graph" refers to a graph whose edges are ordered pairs of vertices, that is, each edge can be followed from one vertex to the next.

As used herein, the term "connected graph" refers to an undirected graph which has a path between every pair of vertices.

As used herein, the term "NP" refers to a class of problems for which answers can be checked for correctness by an algorithm whose run time is polynomial in the size of the input. This does not require or imply that an answer can be found quickly, only that any claimed answer can be verified or refuted quickly. NP is the class which a nondeterministic machine accepts in polynomial time.

As used herein, the term "NP-complete" refers to a class of problems for which answers can be checked for correctness by an algorithm whose run time is polynomial in the size of the input (it is NP) and no other NP problem is more than a polynomial factor harder. Informally, a problem is NP-complete if answers can be verified quickly and the quick algorithm to solve this problem can be used to solve all other NP problems quickly. A trivial example of NP, but not NP-complete, is finding the AND of two boolean bits. The problem is NP, because one can quickly verify that the answer is correct, but knowing how to AND two bits doesn't help one quickly find, say, a tour of a graph. So AND is not NP-complete.

As used herein, the term "vertex cover" refers to a set of vertices in an undirected graph where every edge connects at least one vertex. The vertex cover problem is to find a minimum size set and is NP-complete.

As used herein, the term "polynomial time" refers to the case when the execution time of a computation, p(n), is no more than a polynomial function of the problem size, n. More formally, p(n) equals $O(n^k)$ where k is a constant.

As used herein, the term "tree" refers to a data structure accessed beginning at the root node. Each node is either a leaf or an interior node. An interior node refers to or has links to one or more child nodes and is called the parent of its child nodes. Contrary to a physical tree, the root is usually depicted at the top of the structure and the leaves are depicted at the bottom.

As used herein, the term "forest" refers to a collection of one or more trees.

A WDM network is a bi-directed graph G=(V, E), that is one for which (u, v) is an element of E if and only if (v, u) is an element of E. The undirected graph obtained from G by replacing each bi-directed pair of edges with a single undirected edge is the skeleton of the network G, that is, $G_s$=(V, E'). A set is sufficient in $G_s$ if and only if it is sufficient in G.

Figure 3:
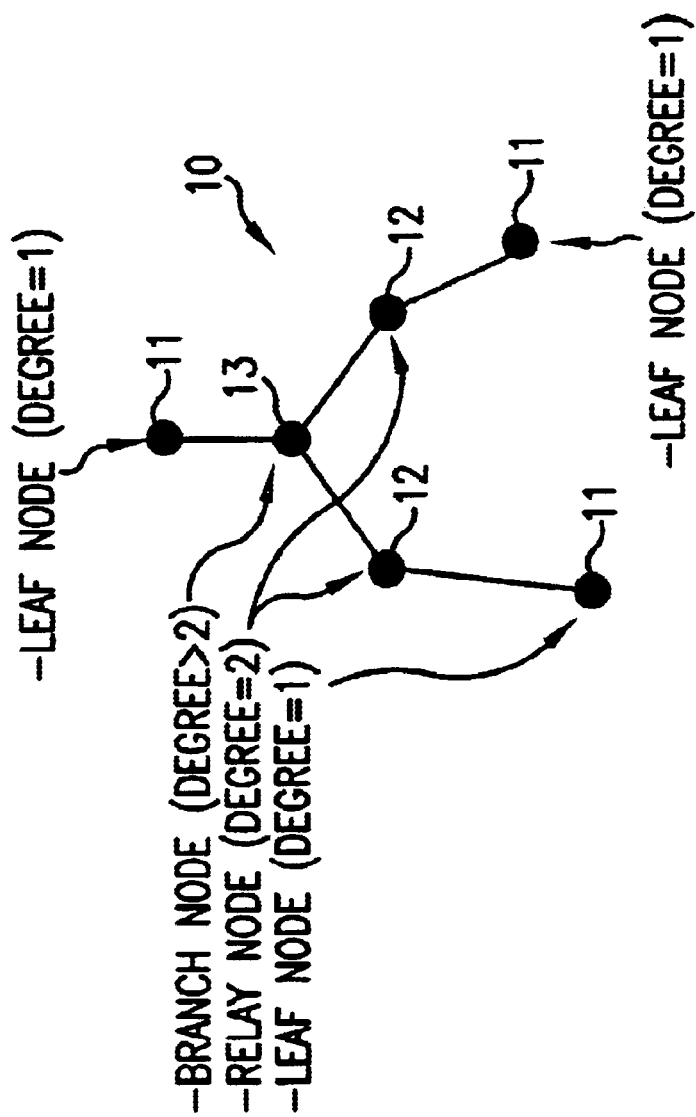
FIG. 3 is a diagram showing the various types of nodes or vertices in a graph corresponding to a network.

A vertex v is referred to as a branching node if its degree in $G_s$ is greater than 2, a relay node if its degree in $G_s$ is equal to 2, or a leaf node if its degree in $G_s$ is equal to 1. A graph 10 has leaf nodes 11, relay nodes 12, and branch node 13 as shown in FIG. 3. A node of a path P is an internal node in the path if it is not one of the two endpoints.

Figure 1B:
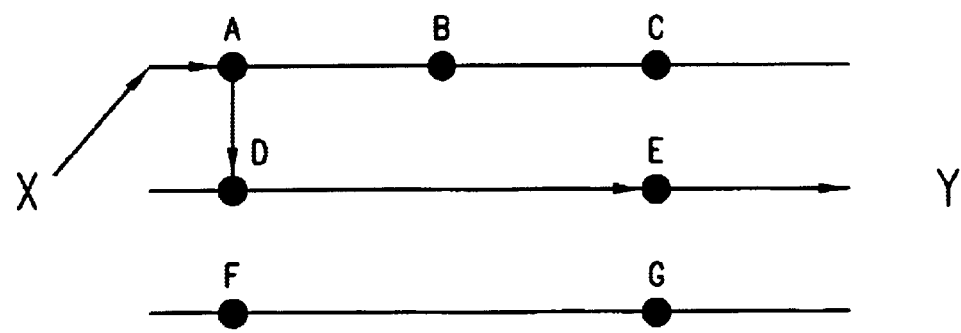
FIG. 1b is a diagram showing the use of a wavelength converter in the network of FIG. 1a as a means for avoiding a congested link in the network.

FIG. 1a shows a network with three paths ABC, DE, and FG. For a signal to travel from X to Y, the signal can travel any of these three paths. However, if the link BC is congested, it would be desirable to avoid this congested link. By placing a wavelength converter at point A, the signal X at A may be converted enabling the path X→A→D→E→Y as shown in FIG. 1b.

Figure 2A:
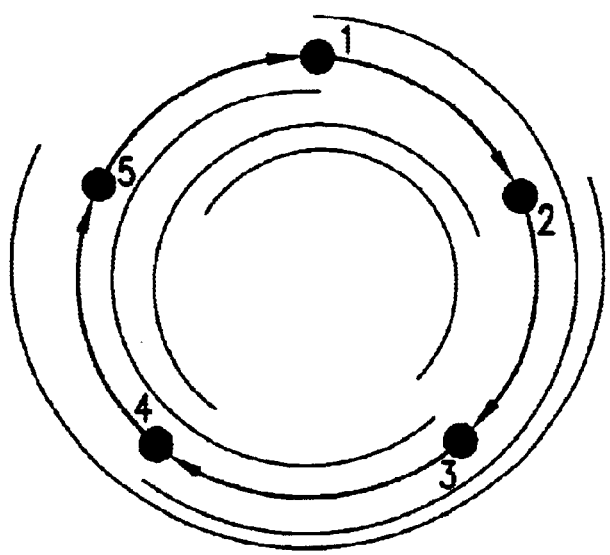
FIG. 2a is a diagram of an example of a network comprising a clockwise ring of five nodes and the communication pairs to set up where no wavelength converters are employed.
Figure 2B:
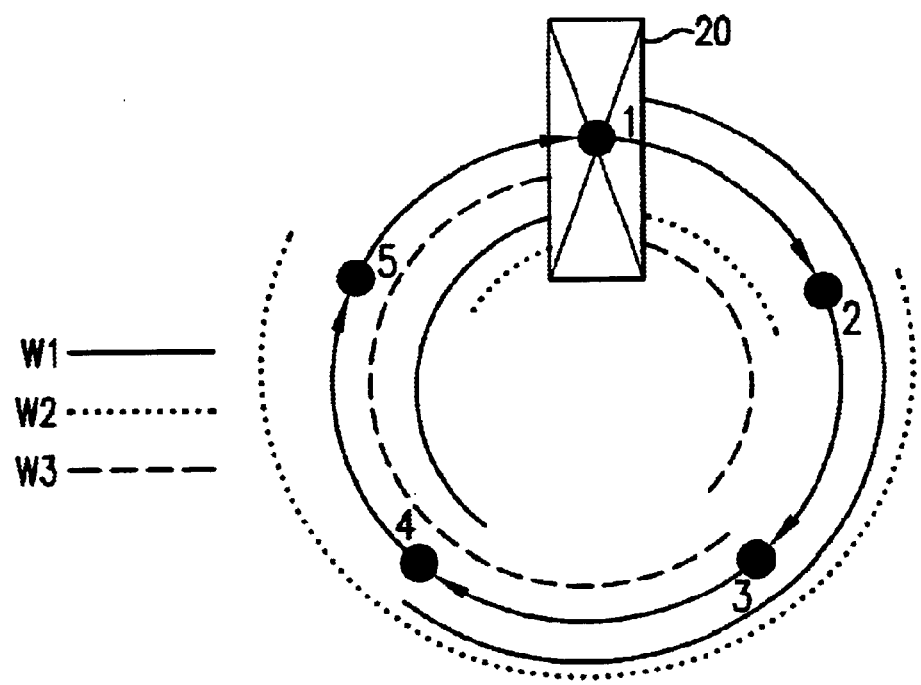
FIG. 2b is a diagram showing the network of FIG. 2a having a wavelength converter for setting up the communication pairs.
Figure 4:
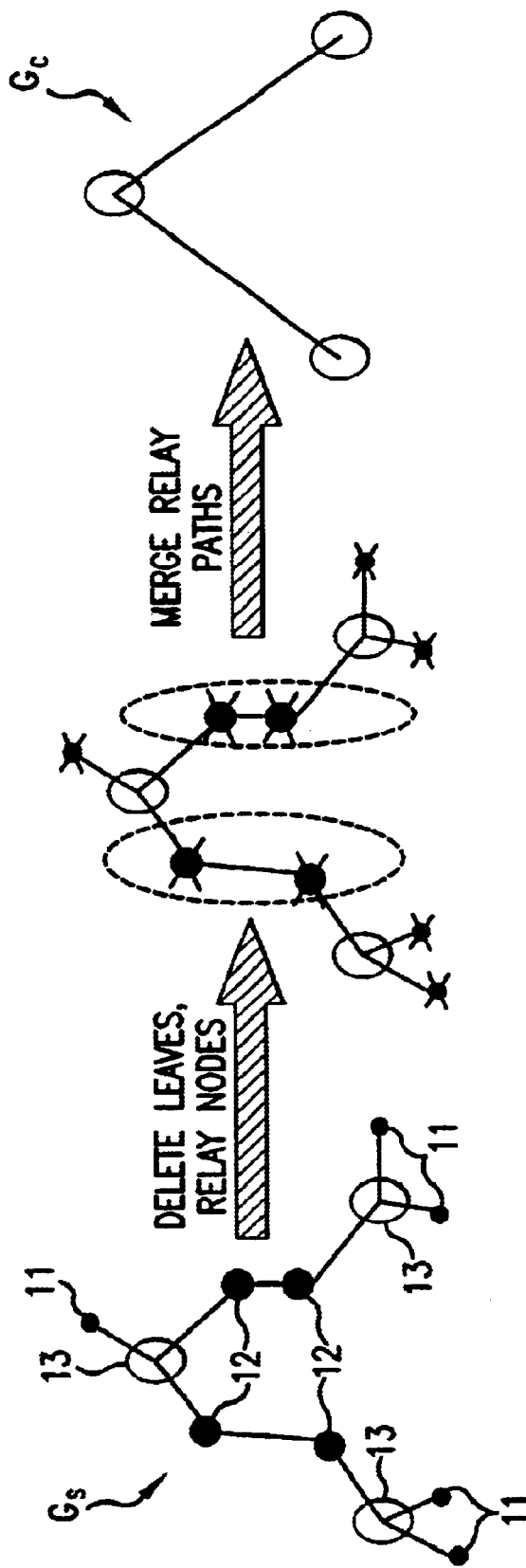
FIG. 4 is a diagram showing a contraction graph.

FIG. 2a shows a network comprising a clockwise ring having five vertices or nodes. To avoid possible congestion in going from Point 1 to Point 4 by way of Points 2 and 3, it is desirable to enable a communication between Point 1 and Point 4. In the example shown in FIG. 2a, there are five communication pairs to set up—[(1, 4), (2, 5), (3, 1), (4, 2), (5, 3)]. Because each of these communication pairs shares some link of the ring, they cannot use the same wavelength. That is, each pair needs its own wavelength and, without the use of a wavelength converter, five wavelengths will be required. However, by adding a wavelength converter 20 as shown in FIG. 2b, the number of wavelengths needed to set up the communication pairs is only three, represented by W1, W2 and W3. Thus the frequency for communication pair (1, 4) is represented by W1; the frequency for communication pair (2, 5) is represented by W2; and the frequency for communication pair (3, 1) is represented by W3. Without the presence of wavelength converter 20, the frequency of the signal going to communication pair (4, 2) is the same as the frequency for communication pair (4, 1), represented by W1. However, with wavelength converter 20 in place, as the signal passes through wavelength converter 20, the frequency is switched for communication pair (1, 2) to a different frequency represented by W2. A similar situation exists for the communication pair (5, 3). This, instead of five wavelengths, only three wavelengths are required. FIG. 4 is a diagram showing a method for constructing another undirected graph $G_c$=($V_c$, $E_c$) from the graph $G_s$, referred to as the contraction of the graph $G_s$. The vertex set $V_c$ consists of all branching nodes 13 in graph $G_s$. For any two branching nodes u and v, (u, v) is an edge in $E_c$ if and only if there exists a path in $G_s$ between u and v such that all internal nodes in this path are relay nodes. By deleting leaf nodes 11 and relay nodes 12 and merging the relay paths, one arrives at the contraction graph $G_c$ shown in FIG. 4.

As previously stated, any minimum vertex cover of the contracted graph $G_c$ is also a minimum sufficient set of graph $G_s$. To find a minimum sufficient set in graph $G_s$, it is only necessary to find a minimum vertex cover of its contraction, a potentially simpler undirected graph. In general, the minimum vertex cover problem is NP-complete and it has a two-approximation algorithm. It is a fixed-parameter tractable problem whether a graph has a vertex cover of size at most k can be decided with time O(f(k)·p(n)) where p(n) is a polynomial function of n, the number of vertices in $G_s$ and f(k) is a fixed-parameter function. If the graphs are planar, the polynomial-time approximation scheme exists. However, when the graph is a tree or a tree of rings, as discussed hereinbelow, a minimum vertex cover can be found in polynomial time.

For WDM networks whose underlying topologies are trees, because any minimum vertex cover of the contraction tree is also a minimum sufficient set of the original network, and because the contraction of any tree is also a tree with the additional property that all internal nodes have degrees of at least three, it is only necessary to identify a minimum vertex cover of the contraction tree.

A general polynomial-time algorithm to find minimum vertex covers in forests, a broader set of topologies than trees, is as follows. An internal node of a forest is referred to as a leaf-root if its nodal degree is more than one and one of its neighbors is a leaf node. See FIG. 5 which shows a portion of a network having a leaf node 25 and a leaf root 26. If a forest has no leaf-roots, then all edges are isolated and its minimum vertex cover consists of one node from each edge. If a forest contains some leaf-roots, then there is a minimum vertex cover which contains all the leaf-roots. This is shown as follows. Let C be a minimum vertex cover of graph G which contains the most number of leaf-roots of graph G, and let u be any leaf-root of graph G that is not in C. Let v be any leaf node that is a neighbor of u. Clearly, v must be in C, for otherwise the edge (u, v) would not be covered by C.

Consider $C'=(C-\{v\})\cup\{u\}$. Then C' is also a minimum vertex cover of graph G and contains one more leaf-roots of G than C. If it is assumed that it is not true that there exists a minimum vertex cover of graph G which contains all leaf-roots of G, the selection of C is contradicted. Thus, it must be true that a minimum vertex cover of G exists which contains all leaf-roots of G.

FIGS. 6a, 6b and 6c are diagrams showing application of the algorithm used in the method of this invention to a binary tree. Contraction of binary tree 30 (FIG. 6a) produces the contraction graph (FIG. 6b) having four leaf roots 4, 5, 6, and 7. By combining this set of leaf nodes with node 2 or 3, one arrives at a minimum sufficient set comprising {4, 5, 6, 7, 2} or {4, 5, 6, 7, 3} (FIG. 6c). In either case, all edges are covered. So, for the binary tree graph in FIG. 6a, the minimum sufficient set is C={4, 5, 6, 7, 2} or C ={4, 5, 6, 7, 3}; and wave converters are placed at these nodes.

Let G be any forest and C be any minimum vertex cover of G which contains all leaf-roots of G. Let G' be the graph obtained from G by removing all leaf-roots of G and their incident edges. G' is referred to as the residue of G. Let C' be the vertex set obtained from C by removing all leaf-roots of G. Then G' is also a forest and C' is a minimum vertex cover of G'. Applying the proposition that a minimum vertex cover of G exists which contains all leaf-roots of G to G' results in another minimum vertex cover C'' which contains all leaf-roots of G'. From this, an example algorithm to find the minimum vertex cover of a forest shown in Table 1 is derived.

TABLE 1

Algorithm to find a minimum vertex cover of a forest.

```
Algorithm: MVC_Forest
Input:      a forest G;
Output:     A minimum vertex cover of G;
begin
    if G has no leaf root
        Return the set consisting of one node from
        each edge;
    else
        add all leaf-roots of G to the vertex cover of
        G;
        form the residue graph G' of G;
        find the minimum vertex cover of G'
        recursively;
        add them to the vertex cover of G;
end
```

In the algorithm MVC_Forest, all leaf-roots are selected in a single recursive step. One variation is to select only one leaf-root in a step. Such leaf-root can be chosen such that its removal and the removal of its incident edges from a tree G results in another tree. Such selection could potentially simplify the implementation. For both approaches, suitable data structures should be carefully designed to achieve a faster running time.

Figure 7:
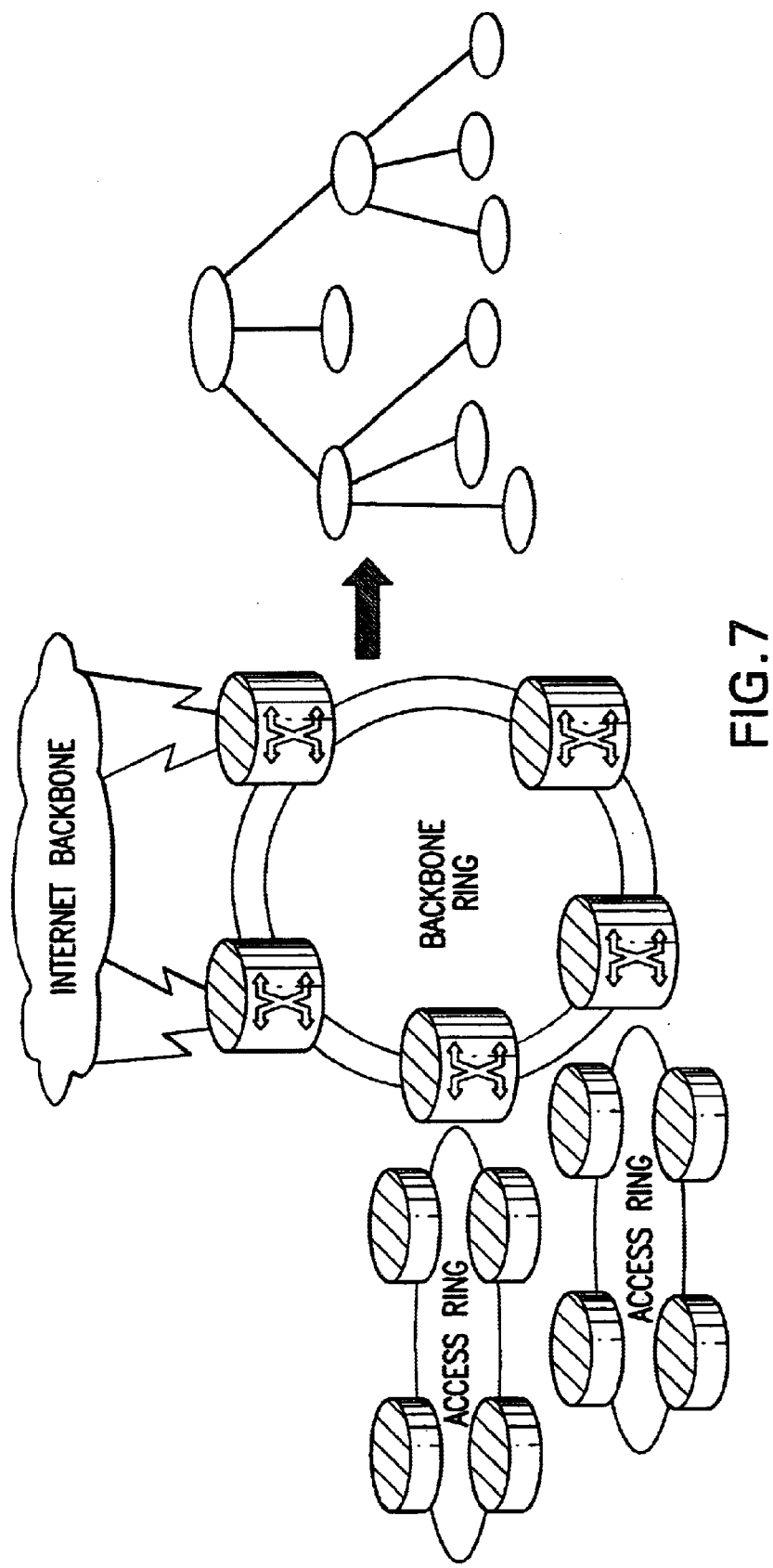
FIG. 7 is a diagram showing a tree of rings network.

A tree of rings, as shown in FIG. 7, is a widely used interconnection topology in the telecommunications industry. In this topology, each node is within a ring and these rings are interconnected by means of a tree-like topology. It will be apparent to those skilled in the art that the contraction of any tree of rings is also a tree of rings. As the minimum vertex cover of the contraction graph provides an optimal sufficient set of the original graph, a polynomial-time algorithm that finds the minimum vertex cover in an arbitrary tree of rings can be provided.

It is well known that there are at least two leaf-nodes in any tree. Similarly, it can be shown that in any tree of rings, there exists at least two rings in which all nodes have a degree of 2 except one whose degree is 3. Such rings are referred to as leaf-rings. The only node in a leaf-ring whose degree is 3 is called a bridging-node. If it is supposed that a leaf-ring contains m nodes, then any minimum vertex cover contains at least $$\lceil \frac{m}{2} \rceil$$

nodes in this leaf-ring, where the ceiling of x is the smallest integer greater than or equal to x. As shown hereinbelow, there is always a minimum vertex cover which contains the bridging-node of any leaf-ring.

Consider the proposition that, where G is a tree of rings, there exists a minimum vertex cover of G which contains all bridging-nodes of all leaf-rings in G. To show that this proposition is true, assume that it is false and let C be a minimum vertex cover of G which contains the most number of bridging-nodes of G, and let u be any bridging-node of G that is not in C. Let R be the leaf-ring containing the bridging-node u. Then R cannot be a self-loop, for otherwise u must be in any vertex cover of G and, thus, in C too. So, R contains m≧2 nodes, for example, $v_1, v_2, \ldots, V_m$, where $v_1 = u$ in a clockwise order. Clearly C must contain at least $$\lceil \frac{m}{2} \rceil$$

nodes in R, that is, $$|C \cap R| \geq \lceil \frac{m}{2} \rceil$$

where |s| is the cardinality of the set s.
If $$C'=(C-R)\cup\{v_i:1\leq i\leq m, i \text{ is odd}\}$$

C' is also a vertex cover of G, and $$|C'| = |C - R| + \lceil \frac{m}{2} \rceil$$

$$= |C| - |C \cap R| + \lceil \frac{m}{2} \rceil$$

$$\leq |C|$$

Thus, C' is also a minimum vertex cover of G. On the other hand, C' contains one more bridging-node of G than C. This contradicts the selection of C as a result of which the proposition must be true.

The proof of this proposition suggests a minimum vertex covering of a leaf-ring. Suppose that a leaf-ring R contains m nodes, for example, $v_1, v_2 \ldots, v_m$ in the clockwise order in which $v_1$ is its bridging node. The set of vertices $$\{v_i : 1 \leq i \leq m, i \text{ is odd}\}$$

is called a canonical vertex cover of the leaf-ring R. For any leaf-ring R, there is a minimum vertex C of G which contains its canonical vertex cover. Let G-R denote the graph obtained from G by removing all nodes in R and their incident edges. Let C-R denote the vertex set obtained from C by removing the canonical vertex cover of R. Then G-R is also a tree of rings and C-R is a minimum vertex cover of G'. On the other hand, the union of the canonical vertex cover of R and any minimum vertex cover of G-R is also a minimum vertex cover of G. Based on this observation, the algorithm shown in Table 2 can be used to find the minimum vertex cover of a tree of rings.

TABLE 2

Algorithm to find a minimum vertex cover of a tree of rings.

Algorithm: MVC_Tree_Rings
Input: A tree of rings G;
Output: A minimum vertex cover of G;
begin
   C = φ;
   while G is not empty
      find a leaf-ring R in G;
      add the canonical vertex cover of R to C;
      G = G - R;
   output C;
end The algorithm MVC_Tree_Rings removes one leaf-ring at each step and adds its canonical vertex cover. With carefully selected data structures and implementation, its run-time can be linear in the size of the network.

From the algorithm MVC_Tree_Rings, the cardinality of any minimum vertex cover of a tree of rings can be explicitly counted.

If we let G=(V, E) be a tree of rings, and k be the number of odd-sized rings in G, then the cardinality of any minimum vertex cover of G is.

$$\frac{|V|+k}{2}.$$

This can be shown as follows. Let $R_1, R_2 \ldots, R_l$ be the component rings in G. According to the above algorithm, each ring will evidentially become a leaf-ring and its canonical vertex cover will be added to the minimum vertex cover of G. It should be noted that the canonical vertex covers of different component rings are disjoint. Thereby, the cardinality of any minimum vertex cover of G is:

$$\sum_{i=1}^{l} \lceil \frac{|R_i|}{2} \rceil = \sum_{i:|R_i| \text{ is even}} \frac{|R_i|}{2} + \sum_{i:|R_i| \text{ is odd}} \frac{|R_i|+1}{2}$$

$$= \sum_{i=1}^{l} \frac{|R_i|}{2} + \frac{k}{2}$$

$$= \frac{1}{2} \sum_{i=1}^{l} |R_i| + \frac{k}{2}$$

$$= \frac{|V|}{2} + \frac{k}{2}$$

$$= \frac{|V|+k}{2}$$

In addition, the cardinality of any minimum sufficient set is at least half of the number of branching-nodes. To reduce the number of converters needed, the topology should be carefully designed. For example, the topology can be chosen such that the number of branching nodes in each component ring is even.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. A method for determining an optimal placement with a minimal number of wavelength converters in an optical network while optimizing bandwidth use comprising the steps of:

generating a skeleton undirected graph of a WDM network;

constructing a contraction graph from said skeleton undirected graph; and determining a minimum vertex cover of said contraction graph; and determining the optimal placement with a minimal number of wavelength converters in the optical network while optimizing bandwidth use.

2. A method in accordance with claim 1, wherein said WDM network comprises an underlying topology of trees.

3. A method in accordance with claim 1, wherein said WDM network comprises an underlying topology of rings.

4. A method in accordance with claim 1, wherein said WDM network comprises an underlying topology of trees of rings.

5. A method in accordance with claim 1, wherein an underlying topology of said WDM networks is a forest.

6. A method for determining an optimal placement with a minimal number of wavelength converters in an optical network having an underlying topology selected from the group consisting of a forest, tree of rings, rings and trees comprising the steps of:

determining a minimum vertex cover for said optical network; and determining the optimal placement with a minimal number of wavelength converters in the optical network.

7. A method in accordance with claim 6, wherein said minimum vertex cover is determined using a polynomial-time algorithm.

8. A method in accordance with claim 7, wherein said underlying topology is a forest comprising at least one leaf-root and said algorithm comprises the steps of adding all of said leaf-roots of said optical network to a vertex cover of said optical network, forming a residue network of said optical network, finding a residue network minimum vertex cover of said residue network and adding said residue network minimum vertex cover to said vertex cover of said optical network.

9. A method in accordance with claim 7, wherein said underlying topology is a tree of rings and said algorithm is an algorithm comprising the steps of determining a vertex cover for said optical network, finding a leaf-ring in optical network, adding a canonical vertex cover of said leaf-ring to said vertex cover and subtracting said leaf-ring from said optical network, resulting in said minimum vertex of said optical network.

10. The method for determining an optimal placement of wavelength converters in an optical network according to claim 6 wherein the underlying topology consists of a forest and wherein in determining a minimum vertex cover for said forest optical network an algorithm is performed to select all leaf-roots in a single recursive step.

11. The method for determining an optimal placement of wavelength converters in an optical network according to claim 6 wherein the underlying topology consists of a forest and determining a minimum vertex cover for said forest optical network further comprises the steps of performing the algorithm:

```
Algorithm:      MVC_Forest
Input:      a forest G;
Output:     A minimum vertex cover of G;
begin
    if G has no leaf root
        Return the set consisting of one node from each edge;
    else
        add all leaf-roots of G to the vertex cover of G;
        form the residue graph G' of G;
        find the minimum vertex cover of G' recursively;
        add them to the vertex cover of G;
end.
```

12. The method for determining an optimal placement of wavelength converters in an optical network according to claim 6 wherein the underlying topology consists of a tree of rings and wherein in determining a minimum vertex cover for said tree of rings optical network an algorithm is performed which removes one leaf-ring at each step and adds a canonical vertex cover of the leaf-ring.

13. The method for determining an optimal placement of wavelength converters in an optical network according to claim 6 wherein the underlying topology consists of a tree of rings and determining a minimum vertex cover for said tree of rings optical network further comprises the steps of performing the algorithm:

```
Algorithm: MVC_Tree_Rings
Input:      A tree of rings G;
Output:     A minimum vertex cover of G;
begin
    C = φ;
    while G is not empty
        find a leaf-ring R in G;
        add the canonical vertex cover of R to C;
        G = G - R;
    output C;
end.
```

* * * * *